(12) United States Patent
Hayabuchi et al.

(10) Patent No.: US 7,097,869 B2
(45) Date of Patent: Aug. 29, 2006

(54) NUTRACEUTICAL CHIPS AND PRODUCTION METHOD THEREOF

(75) Inventors: Hitomi Hayabuchi, Hukuoka (JP); Reiko Miyano, Kawasaki (JP); Motoko Tsunematsu, Kawasaki (JP); Yoshihiro Nomura, Tokyo (JP)

(73) Assignee: Ajinomoto Co., Inc., Tokyo (JP)

( * ) Notice: Subject to any disclaimer, the term of this patent is extended or adjusted under 35 U.S.C. 154(b) by 531 days.

(21) Appl. No.: 10/413,289

(22) Filed: Apr. 15, 2003

(65) Prior Publication Data

US 2003/0232110 A1    Dec. 18, 2003

(30) Foreign Application Priority Data

Apr. 19, 2002    (JP)    .............................. 2002-116927

(51) Int. Cl.
*A23L 1/212*    (2006.01)
*A23L 1/29*    (2006.01)

(52) U.S. Cl. ........................ 426/96; 426/102; 426/512; 426/517; 426/520; 426/573; 426/575; 426/615; 426/632

(58) Field of Classification Search ................. 426/96, 426/102, 615, 632, 517, 512, 520, 573, 575
See application file for complete search history.

(56) References Cited

U.S. PATENT DOCUMENTS 2,403,547 A * 7/1946 Peschardt ................... 426/103
6,027,758 A * 2/2000 McHugh et al. ............ 426/615
6,251,466 B1 * 6/2001 McGuire et al. ............ 426/577
6,340,494 B1 * 1/2002 Klukowski et al. ......... 426/640

* cited by examiner

*Primary Examiner*—Helen Pratt
(74) *Attorney, Agent, or Firm*—Oblon, Spivak, McClelland, Maier & Neustadt, P.C.

(57) ABSTRACT

In this application are disclosed a method for producing nutraceutical chips, comprising the steps of: preparing a viscous liquid by use of at least one selected from the group consisting of vegetables, fruits, seeds, nuts and seaweeds which may have been heat-treated in advance as desired or as required, and a calcium-coagulable edible polymer material, spreading the viscous liquid into thin layers, applying an aqueous calcium salt solution onto the thin layers, whereby the calcium-coagulable edible polymer material is caused to gel, and heat-drying or/and vacuum-drying the resulting thin-film gel products, and a method for producing nutraceutical chips, comprising the steps of: preparing a gel by use of at least one selected from the group consisting of vegetables, fruits, seeds, nuts and seaweeds which may have been heat-treated in advance as desired or as required, a calcium-coagulable edible polymer material, and a calcium salt, molding the gel into thin films, and heat-drying or/and vacuum-drying the resulting thin-film gel products, according to which methods new nutraceutical chips are provided which improve the shelf life and processability of the raw material vegetable, fruit, seed, nut, seaweed or the like, use no fats and oils, and are suitable for the health, nutrition and palatability of consumers.

12 Claims, No Drawings

NUTRACEUTICAL CHIPS AND PRODUCTION METHOD THEREOF

BACKGROUND OF THE INVENTION

1. Technical Field of the Invention

The present invention relates to a health-appealing food which has improved shelf life of vegetable, fruit, seed, nut, seaweed and the like and has characteristics that it is rich in calcium and dietary fiber, that it is oil-free and that it is low in calories. Further, the present invention also relates to a method for producing snack food chips which can conform to a variety of requests associated with the health, nutrition, preference and the like of consumers, from vegetables, fruits, seeds, nuts, seaweeds and the like. In addition, the present invention also relates to a snack food which incorporates a poly-γ-glutamic acid so as not only to retain calcium and increase the content of calcium but also to enable calcium to be efficiently absorbed into a living body, in other words, enhance absorbability of calcium.

2. Related Art

A variety of processed foods are produced and sold which take advantage of the characteristics of raw materials such as vegetables and fruits of various types, i.e., being naturally occurring materials and being good for health. For example, in Japanese Patent Application Laid-Open (Kokai) No. 45769/1992, a method of producing a healthy snack food using a large quantity of vegetables such as spinach, burdock and pumpkin and fruits such as apple, pineapple and banana, is disclosed. However, according to this production method, fats and oils are added to the paste-like material in a proportion of 5 to 15% so as to impart crunchiness to the target healthy snack food, so that the resulting healthy snack food becomes high in calories.

Further, in Japanese Patent Application Laid-Open (Kokai) No. 178422/2001, a fish-egg processed food sheet produced by forming fish eggs into a sheet with the use of a film forming edible polymer material is proposed. This claims that the processed food sheet is rich in calcium and dietary fiber and low in calories. However, vegetables, fruits, seeds, nuts and seaweeds other than fish eggs are not studied. Further, no mention is made of the absorption of in-taken calcium.

[Problems to be Solved by the Invention]

It is an object of the present invention to provide a processed food (snack food) made from vegetable, fruit, seed, nut, seaweed or the like which improves the shelf life and processability of the vegetable, fruit, seed, nut, seaweed or the like, uses no fats and oils, has crispiness, and is rich in calcium and dietary fiber and low in calories. Another object of the present invention is to provide a snack food in respect of which the absorption of the calcium contained therein can be accelerated.

[Means for Solving the Problems]

The present inventors have made intensive studies so as to achieve the above objects. As a result, the they have found that the objects can be achieved by processing vegetable, fruit, seed, nut, seaweed or the like with the use of a calcium-coagulable edible polymer material or a poly-γ-glutamic acid in addition to the calcium-coagulable edible polymer material. The present inventors have completed the present invention based on these findings.

Accordingly, a first aspect of the present invention relates to a method for producing nutraceutical chips, comprising the steps of:

preparing a viscous liquid by use of at least one selected from the group consisting of vegetables, fruits, seeds, nuts and seaweeds which may have been heat-treated in advance as desired or as required, and a calcium-coagulable edible polymer material, spreading the viscous liquid into thin layers, applying a calcium salt aqueous solution onto the thin layers, whereby the calcium-coagulable edible polymer material is caused to gel, and heat-drying or/and vacuum-drying the resulting thin-film gel products.

A second aspect of the present invention relates to a method for producing nutraceutical chips, comprising the steps of:

preparing a gel by use of at least one selected from the group consisting of vegetables, fruits, seeds, nuts and seaweeds which may have been heat-treated in advance as desired or as required, a calcium-coagulable edible polymer material, and a calcium salt, molding the gel into thin films, and heat-drying or/and vacuum-drying the resulting thin-film gel products.

The second aspect method is equivalent to the first aspect method.

And, a third aspect of the present invention relates to a method for producing nutraceutical chips according to the first or second aspect method, wherein a poly-γ-glutamic acid is additionally used.

EMBODIMENT OF THE INVENTION

The present invention will be explained below in greater detail.

A vegetable, fruit, seed, nut and seaweed to be used as a raw material in the production method of the present invention may be any vegetable, fruit, seed, nut and seaweed as long as the objects of the present invention are achieved. Illustrative examples of the vegetable include pumpkin, potato, sweet potato, carrot, spinach, bean and the like. Illustrative examples of the fruit include apple, banana, strawberry, orange, mango, avocado and the like. Illustrative examples of the nut and seed include sesame seed and the like. Illustrative examples of the seaweed include layer and the like. Further, the fruit can also be used in the form of fruit extract as exemplified by prune extract and the like. Thus, the term "fruit" in the following description of the present specification means also a fruit extract unless it needs to be interpreted in a different way in the context. In addition, these vegetable, fruit, seed, nut and seaweed can also be used in combination of two or more.

A calcium-coagulable edible polymer material is an edible polymer material which coagulates and forms a thin-film gel when an aqueous solution thereof is spread thinly and an aqueous calcium salt solution (aqueous calcium ions containing solution) is placed thereon. Paying attention to such film formability, a calcium-coagulable edible polymer material related to the present invention may be referred to hereinafter as a film-forming edible polymer material.

Illustrative examples of the film-forming edible polymer material include marine edible polymer materials such as a seaweed extract (e.g., an alginic acid and the sodium salt thereof, carageenan, agar and the like), a crustaceous component material (e.g., chitin, chitosan and the like) and the like, and terrestrial edible polymer materials such as a potato (e.g., mannan and the like), a fruit (e.g., pectin), a mushroom (e.g., β-glucan and the like) and the like. These polymer materials can be used alone or in combination of two or more as desired. As is well known, all of these polymer materials belong to dietary fiber.

Particularly, the blood pressure lowering effect, the cholesterol lowering effect, the antiulcer effect, the constipation preventing effect and the like are expected from alginic acid and chitosan, and the sodium moiety of sodium alginate is replaced by the calcium (ions) used for coagulation so as to achieve the calcium addition effect. Thus, such polymer materials are preferably used. Further, sodium alginate is particularly preferred in that a snack food having excellent crispiness can be obtained.

As the calcium salt, an easily soluble salt such as calcium chloride is preferred since it causes a reaction instantaneously, while an insoluble calcium salt such as calcium carbonate or calcium secondary phosphate can be preferably used when an thick polymer material must be gelled completely.

Preferable examples of the poly-γ-glutamic acid include a poly-γ-glutamic acid obtained by decomposing, by use of an acid or an enzyme, a poly-γ-glutamic acid extracted from a fermented soy bean viscous substance or secreted out of a Bacillus and having a molecular weight measured with a low-angle laser light scattering meter of higher than $3 \times 10^5$ to the extent that it has a molecular weight measured by the measurement method of $1 \times 10^4$ to $3 \times 10^5$. Since the poly-γ-glutamic acid mentioned above promotes intestinal absorption of minerals (refer to specifications of Japanese Patent Nos. 2,712,583 and 3,232,718), it can promote intestinal absorption of the calcium contained in the snack food of the present invention.

Next, a method for producing nutraceutical chips according to the present invention by use of at least one selected from the group consisting of the foregoing vegetable, fruit, seed, nut and seaweed, the foregoing calcium-coagulable edible polymer material (film-forming edible polymer material), the foregoing calcium salt, and the foregoing poly-γ-glutamic acid as desired will be concretely described. Incidentally, the term "nutraceuticals" is a neologism referring to "health supplements" which are positioned somewhere between "nutrition" and "pharmaceuticals". The nutraceutical chips of the present invention are a snack food in the form of chips (i.e., in the form of so-called potato chips or cereal flakes) which are nutraceuticals in the above sense.

First, the production method according to the first aspect of the present invention will be described.

In preparing a viscous liquid by use of at least one selected from the group consisting of vegetables, fruits, seeds, nuts and seaweeds and a calcium-coagulable edible polymer material, it is preferable to form the vegetable, fruit, seed, nut or/and seaweed into a paste in advance so that they can be mixed well with the calcium-coagulable edible polymer material. To prepare such a paste, pumpkin, potato, apple or the like should be heat-treated so as to be softened. By the heat treatment, enzymes are also deactivated.

Thus, when the vegetable, fruit, seed, nut and seaweed are heat-treated to the extent that they can be eaten at this point in time or at this stage, drying in a subsequent step can be carried out sufficiently, only by vacuum drying. To prepare such a paste from vegetable, fruit, seed, nut or the like, they can be, for example, grated in a raw state without being previously heat-treated. In this case, the paste can be rendered suitable for eating by carrying out heat drying in the subsequent drying step.

The vegetable, fruit, seed, nut or/and seaweed which has/have been heat-treated in advance so as to be formed into a paste as desired or as required is/are then mixed with a film-forming edible polymer material and, as required, water so as to prepare a viscous liquid. In this case, the compounding ratio (mixing ratio) of the edible polymer material to the vegetable, fruit, seed, nut or/and seaweed (raw material(s)) is about 8:2 to 5:5. The compounding ratio should be adjusted to 8:2 when it is desired to increase the content of calcium in nutraceutical chips as the product, while the amount of the vegetable, fruit, seed, nut or/and seaweed should be increased when it is desired to make distinct the characteristics of the vegetable, fruit, seed, nut or/and seaweed. Thereby, the characteristics of the raw materials can be emphasized.

When a poly-γ-glutamic acid is added as desired, it is used in an amount of 0.001 to 2 wt % based on the total amount of the raw materials, i.e., the vegetable, fruit, seed, nut or/and seaweed, and the film forming edible polymer material. The larger the amount of the poly-γ-glutamic acid to be added is, the more calcium is kept in the snack food, i.e., the larger the content of calcium in the snack food is, and the better the absorbability of calcium into a human body is.

When sodium alginate is used as the film-forming edible polymer material, it is preferable to use sodium alginate in the form of an aqueous solution so as to mix the sodium alginate with the vegetable, fruit, seed, nut or/and seaweed uniformly. The viscosity of an aqueous sodium alginate solution which can be molded easily is 100 to 1,000 mPa·s. The texture of the snack food product is associated with the degree of polymerization, and sodium alginate having a degree of polymerization of not smaller than about 400 gives a favorable texture.

The viscous liquid prepared by use of the raw materials, i.e., the vegetable, fruit, seed, nut or/and seaweed and the film-forming edible polymer, or in addition thereto, the poly-γ-glutamic acid, is spread into thin layers, and an aqueous calcium salt solution is applied onto the thin layers so as to cause the calcium-coagulable edible polymer material to gel. More specifically, the above viscous liquid is spread thinly over, for example, a flat plate. Alternatively, to prevent the viscous liquid from flowing down from a flat plate, the viscous liquid is poured thinly into, for example, a frame such that the surface of the liquid in the frame becomes flat. Onto the thin layers, a proper amount of a coagulating agent (aqueous calcium salt solution) is applied by a method such as pouring or spraying, and the thin layers are then left to stand until the whole thin layers are gelled. Alternatively, the above viscous liquid may be extruded into the aqueous calcium salt solution (coagulating agent) in the form of a thin layer via a slit or the like and then gelled. When, for example, sodium alginate is used as the film-forming polymer material, its sodium ions are replaced by calcium ions, whereby an alginic acid is coagulated or gelled.

When the whole thin layer is gelled and formed into a molded sheet, the sheet is removed from the flat plate or the mold frame or the gelled thin layer is taken out of the coagulating agent, and the calcium salt remaining on the surface is washed out with water so as to remove the bitterness of calcium salt. After fully drained, the gelled sheet is cut into an appropriate size as required.

It is then heat-treated to be dried. As a heat-drying method, a treatment method which is generally employed in heat-drying of food can be used. For example, a hot plate, vacuum-heat-drying or the like can be used. Further, freeze-drying can also be used.

As desired, at an appropriate step before or after molding, for example, at the time of mixing the polymer material with the vegetable, fruit, seed, nut or/and seaweed, or before or after drying subsequent to molding, proper amounts of seasonings (such as sweetener, salt, flavor enhancer (umami), acidifier, liquor, and the like), spices and spice extracts (such as capsicum, ginger, garlic, cinnamon, and other spices and extracts thereof), food additives such as flavors, gluconodeltalactone and the like, and the like may be added.

Next, the production method according to the second aspect of the present invention will be described.

As described above, the production method according to the first aspect of the present invention comprises the steps of preparing once a viscous liquid from vegetable, fruit, seed, nut or/and seaweed, and a calcium-coagulable edible polymer material, or a poly-γ-glutamic acid in addition thereto, spreading the viscous liquid, for example, into thin layers as described above, and applying a coagulating agent thereon so as to cause the thin layers to gel. As compared therewith, the production method according to the second aspect of the present invention comprises the steps of preparing a gel by mixing all these raw materials together at a time, molding the gel into desired shapes so that they have shapes such as potato chips or cereal flakes when dried, and then heat-drying or/and vacuum-drying the molded gels as in the production method according the second aspect of the present invention so as to obtain target nutraceutical chips.

Therefore, the ratio of the amounts to be used of the raw materials including water may be the same as those in the production method according to the first aspect of the present invention. However, in the production method according to the first aspect of the present invention, an appropriate manner of removing an excessively used calcium salt as a coagulating agent such as bitter calcium chloride with water is available. As compared therewith in the production method according to the second aspect of the present invention, due to its nature, removal of an excessive coagulating agent is difficult. Therefore, it is needless to say that the coagulating agent is preferably used in the same amount in terms of equivalents as that of the calcium-coagulable edible polymer material.

EXAMPLES

The present invention will be described in still greater detail with reference to Examples, but it is not limited thereby.

Example 1

Study of Viscosity and Concentration of Sodium Alginate

Influences of the concentrations of aqueous solutions of the following five types of sodium alginates having different degrees of polymerization on the quality of the target snack food were studied. The five types of sodium alginates are referred to as Sodium alginate A (degree of polymerization: about 600, concentration: 0.5, 1 and 1.5%), Sodium alginate B (degree of polymerization: about 500, concentration: 0.5, 1 and 1.5%), Sodium alginate C (degree of polymerization: about 450, concentration: 0.5, 1 and 2%), Sodium alginate D (degree of polymerization: about 400, concentration: 1, 2 and 3%), and Sodium alginate E (degree of polymerization: about 300, concentration: 1, 2 and 3%), respectively.

That is, the concentrations of the sodium alginates were set (at the above concentrations) such that their viscosities would be about 100 to 10,000 mPa·s. Then, a 120 g portion of each of the sodium alginate solutions was added to a 30 g portion out of 100 g of pumpkin which had been heated and softened in a 500-W microwave oven for 1.5 minutes, and 0.15 g of poly-γ-glutamic acid (molecular weight: 28,000) was added thereto so as to prepare a viscous liquid. A 50 g portion of the viscous liquid was poured into a stainless steel mold frame (15 cm×20 cm×3 cm) (to a thickness of about 2 mm) such that the surface of the poured liquid would be flat, and 200 ml of 1% calcium chloride solution was then applied onto the surface so as to replace the sodium with the calcium, thereby causing the liquid to gel. A calcium chloride solution remaining on the surface of the resulting thin film was washed out with water, the residual water was wiped off the surface with kitchen paper, and then the thin film was cut into appropriate size (about 2 cm×3 cm). The small piece was placed on a hot plate so as to evaporate the water and further dried in a heat-vacuum-dryer (100° C., 2 hours) so as to obtain a vegetable snack food (size: about 10 mm×20 mm×1 mm).

The following Table 1 shows the types (degrees of polymerization) of the sodium alginates used and the results of evaluations of ease of gelation (ease of molding) based on concentrations and viscosities and textures of the sodium alginates. The ease of gelation was evaluated on a 4-level scale. As the result of evaluation of the texture, an average of points given by 5 panelists is shown, the points being increased or decreased in increments of 0.5 and being 3 at the maximum. Further, the results of overall evaluations based on a 4-level scale are also shown.

TABLE 1

| Degree of polymerization | Concentration (%) | Viscosity (mPa·s) | Ease of molding | Texture | Overall evaluation |
|---|---|---|---|---|---|
| A (about 600) | 0.5 | 150 | ○ | 2.7 | ⊚ |
|  | 1 | 930 | Δ | 2.8 | ○ |
|  | 1.5 | 3655 | x | 1.7 | x |
| B (about 500) | 0.5 | 71 | ○ | 2.5 | ⊚ |
|  | 1 | 423 | ⊚ | 3.0 | ⊚ |
|  | 1.5 | 1456 | x | 2.4 | ○ |
| C (about 450) | 0.5 | 56 | Δ | 2.2 | ○ |
|  | 1 | 332 | ⊚ | 1.5 | ○ |
|  | 2 | 3560 | x | 3.0 | ○ |
| D (about 400) | 1 | 123 | ○ | 1.4 | Δ |
|  | 2 | 926 | Δ | 1.3 | Δ |
|  | 3 | 3770 | x | 1.0 | x |
| E (about 300) | 1 | 69 | ○ | 1.6 | Δ |
|  | 2 | 538 | ○ | 1.4 | Δ |
|  | 3 | 1995 | x | 1.5 | x |

As can be understood from Table 1, the ease of molding and the textures of the snack foods are different depending on the types and concentrations of the sodium alginates. It is understood from the overall evaluations that the viscosity of the aqueous sodium alginate solution is preferably 100 to 1,000 mPa·s and the degree of polymerization is preferably not smaller than about 400.

Example 2

Compounding Ratios of Sodium Alginate and Raw Materials

The compounding ratios (mixing ratios) of sodium alginate to a raw material such as a vegetable were studied.

That is, an aqueous 1% sodium alginate solution and 100 g of peeled, seed-removed pumpkin which had been heated and softened in a 500-W microwave oven for 1.5 minutes were mixed together at compounding ratios of 10:0, 9:1, 8:2, 7:3, 6:4, 5:5, 4:6, 3:7 and 2:8 such that the total amount would be 150 g. To each mixture, 0.15 g of the same poly-γ-glutamic acid as used in Example 1 was added so as to prepare viscous liquids. After 50 g of each viscous liquid was poured into a stainless steel mold frame (15 cm×20 cm×3 cm) such that the surface of the poured liquid would be flat, 200 ml of 1% calcium chloride solution was applied onto the surface so as to replace the sodium in the sodium alginate with the calcium in the calcium chloride, thereby causing the liquid to gel. The calcium chloride solution remaining on the surface of the resulting thin films was washed out with water, the residual water was wiped off the surface with kitchen paper, and then the thin films were cut into appropriate sizes (about 2 cm×3 cm). The small pieces were placed on a hot plate so as to evaporate the water and further dried in a heat-vacuum-dryer (100° C., 2 hours) so as to obtain a vegetable snack food (size: about 10 mm×20 mm×1 mm).

The following Table 2 shows the results of evaluations of the content of calcium and texture which are expressed as averages of points given by 5 panelists, the points being increased or decreased in increments of 0.5 and being 3 at the maximum.

TABLE 2

| Compounding Ratio | Moldability | Content of Ca (%) | Texture |
|---|---|---|---|
| 10:0 | Film was formed instantaneously, the inside of the liquid could not be gelled. | 9.04 | 1 |
| 9:1 | Film was formed, the inside of the liquid could not be gelled completely. | 3.04 | 1.4 |
| 8:2 | Liquid could be gelled. | 2.93 | 2.1 |
| 7:3 | Liquid could be gelled. | 2.33 | 2.4 |
| 6:4 | Liquid could be gelled. | 1.73 | 2.3 |
| 5:5 | Liquid could be gelled. | 1.13 | 1.9 |

TABLE 2-continued

| Compounding Ratio | Moldability | Content of Ca (%) | Texture |
|---|---|---|---|
| 4:6 | Liquid could not be gelled due to too much raw material. | — | Impossible to evaluate |
| 3:7 | Liquid could not be gelled. | — | Impossible to evaluate |
| 2:8 | Liquid could not be gelled at all. | — | Impossible to evaluate |

Example 3

Raw Materials and Nutritive Values

Raw material such as vegetable or the like was changed and the nutritive values were studied.

Raw materials were pretreated in the following manner. That is, 100 g of a peeled, seed-removed pumpkin was heated and softened in a 500-W microwave oven for 1.5 minutes. This procedure was repeated twice so as to prepare 200 g of softened pumpkin in total. Potatoes were boiled in boiling water for 20 minutes so as to be softened and then peeled. Apples were peeled and cored, and 100 g of the apple having a thickness of 7 to 8 mm was heated in a 500-W microwave oven for 2 minutes so as to deactivate the enzymes. This procedure was repeated twice so as to prepare 200 g of enzyme-deactivated apple in total.

A 200 g portion of each of the pretreated raw materials was formed into a paste by means of a universal grinding stirring machine "ROBOCOUP", 800 g of an aqueous 1% sodium alginate solution and 1 g of poly-γ-glutamic acid were added to the pastes, and the pastes were mixed in a universal cooking mixer "KITCHEN AID" so as to prepare viscous liquids.

After a 85 g portion of each viscous liquid was poured into a large-size tray (22 cm×29 cm×3 cm) such that the surface of the poured liquid would be flat, 200 ml of 1% calcium chloride solution was applied thereonto so as to replace the sodium in the sodium alginate with the calcium in the calcium chloride, thereby causing the liquid to gel. The aqueous calcium chloride solution remaining on the surface of the resulting thin films was washed out with water, the residual water was wiped off the surface with kitchen paper, and then the thin films were cut into appropriate sizes (about 2 cm×3 cm). The small pieces were freeze-dried so as to obtain three types of vegetable and fruit snack foods.

The nutritional components of the snack foods were analyzed. The following Table 3 shows the nutritive values of the raw materials and, as reference examples, the nutritive values of commercial potato chips, Ebisen and milk.

TABLE 3

| | g/100 g | Water | Protein | Lipid | Ash | Carbohydrate | Dietary fiber | Energy | Calcium |
|---|---|---|---|---|---|---|---|---|---|
| Examples | Pumpkin | 4 | 5.7 | 1.3 | 7.2 | 64.3 | 17.5 | 292 kcal | 1.97 |
| | Potato | 4.8 | 6.2 | 0.4 | 8.5 | 64 | 16 | 285 kcal | 2.77 |
| | Apple | 5.8 | 2.4 | 1 | 16 | 33.8 | 41 | 154 kcal | 5.69 |
| Reference | Potato chips | 2 | 4.7 | 35.2 | 3.4 | 54.3 | 0.4 | 554 kcal | 0.017 |
| Examples | Ebisen (*) | 1 | 6.8 | 19.1 | 2.8 | 70.1 | 0.2 | 480 kcal | 0.146 |
| | Cow's milk | 87.4 | 3.3 | 3.8 | 0.7 | 4.8 | 0 | 67 kcal | 0.11 |

(*) A kind of cracker made of wheat flour and shrimp

As is shown in Table 3, the snack foods of the present invention are lower in lipid than the commercial snack foods and milk. Further, sodium ions are replaced by calcium ions at the time of coagulating the mixture, so that the content of calcium increases and the amount of dietary fibers also increases. It is understood that the snack foods of the present invention are rich in calcium and dietary fibers and low in calories regardless of the types of the raw materials.

Example 4

Pumpkin

A peeled, seed-removed pumpkin was sliced into a thickness of 1 cm, heated in a steamer for 10 minutes and then formed into a paste by means of a universal grinding stirring machine "ROBOCOUP". The paste was divided into portions each weighing 30 g. Then, 0 g, 0.075 g (0.05% based on the total amount), 0.15 g (0.1%), 0.3 g (0.2%) and 0.75 g (0.5%) of poly-γ-glutamic acids were added to, and mixed with, five portions, respectively. Then, 120 g of 1% sodium alginate solution was added to each mixture, and the resulting mixtures were each kneaded in a universal cooking mixer "KITCHEN AID" so as to prepare viscous liquids. After 50 g of each of the viscous liquids was poured into a mold frame and the surface of the poured liquid was made to be flat, 200 ml of 1% calcium chloride solution was applied thereonto so as to replace the sodium in the sodium alginate with the calcium in the calcium chloride, whereby the liquid was caused to gel. The aqueous calcium chloride solution remaining on the surface of the resulting thin film was washed out with water, the residual water was wiped off the surface with kitchen paper, and then the thin film was cut into appropriate size (about 2 cm×3 cm). The small pieces were heat-dried so as to prepare a vegetable snack food, and the content of the calcium therein was measured.

The effects of addition of the poly-γ-glutamic acid is shown in the following Table 4.

TABLE 4

| Proportion of Added Poly-γ-glutamic Acid (%) | Ratio of Content of Calcium to Control |
|---|---|
| 0 | 1.00 |
| 0.05 | 1.06 |
| 0.1 | 1.11 |
| 0.2 | 1.08 |
| 0.5 | 1.19 |

It is understood from the above table that the addition of poly-γ-glutamic acid increases the content of calcium in the snack food 1.2 times at the maximum. This is ascribable to the fact that the added poly-γ-glutamic acid has an effect of retaining the calcium.

Example 5

Seed and Nut

To 15 g of a black sesame paste were added 135 g of 1% sodium alginate solution, 0.15 g of poly-γ-glutamic acid and 0.6 g of table salt, and they were mixed together by means of a universal cooking mixer "KITCHEN AID" so as to prepare a viscous liquid. Then, the viscous liquid was molded and heat-dried in the same manner as in Example 1 so as to obtain a snack food (size: about 10×20×1 mm).

Example 6

Laver 7.5 g of toasted layer was crushed into a powder by means of a blender "OSTERIZER". To the powder, 142.5 g of 1% sodium alginate solution, 0.15 g of poly-γ-glutamic acid and 0.6 g of table salt were added, and they were mixed together by means of a universal cooking mixer "KITCHEN AID" so as to prepare a viscous liquid. Then, the viscous liquid was molded and heat-dried in the same manner as in Example 1 so as to obtain a snack food (size: about 10×20×1 mm).

Example 7

Apple

To 206 g of an aqueous 3% sodium alginate solution, 100 g of an apple paste prepared by heating peeled and cored apples so as to deactivate the enzymes and forming the heated apple into a paste by means of a universal grinding stirring machine "ROBOCOUP" was added, and the mixture was stirred well in a universal cooking mixer "KITCHEN AID" so as to prepare a viscous liquid. Then, a whitish solution of 0.65 g of calcium secondary phosphate dispersed in 100 g of water was added thereto, and a solution of 6 g of gluconodeltalactone dispersed in 100 g of water was further added so as to accelerate the reaction concerned, and the mixture was stirred. The mixture was poured into a mold frame (15 cm×20 cm×3 cm) and left to stand at room temperature for 3 hours so as to complete gelation. The gel was cut into appropriate size (about 20 mm×30 mm×3 mm) and heat-dried to obtain a snack food.

By this method, chips having uniform shapes can be prepared, and the shapes can be controlled freely.

[Effects of the Invention]

According to the method of the present invention, there is provided a novel snack food which provides new texture, achieves long-time shelf life of vegetable, fruit (including fruit extracts), seed, nut or/and seaweed, and conforms to the health, nutrition and preference of consumers. The snack food can be widely used as a healthy snack which is rich in calcium and dietary fibers, oil-free, and low in calories.

Further, addition of poly-γ-glutamic acid causes a further increase in the content of calcium and provides an effect of promoting absorption of calcium in a living body.

The invention claimed is:

1. A method for producing a nutraceutical chip, comprising:
   preparing a viscous liquid which comprises (a) a first component which is at least one ingredient selected from the group consisting of vegetables, fruits, seeds, nuts and seaweeds, and (b) a calcium-coagulable edible polymer material,
   spreading said viscous liquid into a thin layer, forming a gel by applying an aqueous calcium salt solution onto said thin layer, and drying said gel wherein said viscous liquid further comprises poly-γ-glutamic acid.

2. The method of claim 1, wherein said calcium-coagulable edible polymer material is sodium alginate and said calcium salt is calcium chloride.

3. The method of claim 1, wherein said first component is at least one member selected from the group consisting of pumpkin, potato, sweet potato, carrot, spinach, bean, banana, apple, strawberry, orange, mango, avocado, sesame seed and laver.

4. The method of claim 1, wherein said first component has been heat-treated in advance of preparing said viscous liquid.

5. The method of claim 1, wherein said drying of said gel comprises heat drying.

6. The method of claim 1, wherein said drying of said gel comprises vacuum drying.

7. A method for producing a nutraceutical chip, comprising:
   preparing a gel which comprises (a) a first component which is at least one ingredient selected from the group consisting of vegetables, fruits, seeds, nuts and seaweeds, (b) a calcium-coagulable edible polymer material, (c) a calcium salt, and poly-γ-glutamic acid/.
   molding said gel into a thin film, and drying gel.

8. The method of claim 7, wherein said calcium-coagulable edible polymer material is sodium alginate and said calcium salt is calcium chloride.

9. The method of claim 7, wherein said first component is at least one member selected from the group consisting of pumpkin, potato, sweet potato, carrot, spinach, bean, banana, apple, strawberry, orange, mango, avocado, sesame seed and layer.

10. The method of claim 7, wherein said first component has been heat-treated in advance of preparing said viscous liquid.

11. The method of claim 7, wherein said drying of said gel comprises heat drying.

12. The method of claim 7, wherein said drying of said gel comprises vacuum drying.

* * * * *